US011226679B1

United States Patent
Chu et al.

(10) Patent No.: US 11,226,679 B1
(45) Date of Patent: Jan. 18, 2022

(54) HUMAN NEGLIGENCE WARNING METHOD BASED ON AUGMENTED REALITY

(71) Applicant: National Tsing Hua University, Hsinchu (TW)

(72) Inventors: Chih-Hsing Chu, Hsinchu (TW); Ching-Che Chiu, Taoyuan (TW); Chun Soon, Taipei (TW); Chen-Yu Weng, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/225,825

(22) Filed: Apr. 8, 2021

(30) Foreign Application Priority Data

Dec. 22, 2020 (TW) .................................. 109145466

(51) Int. Cl.
*G06F 3/01* (2006.01)
(52) U.S. Cl.
CPC .............. *G06F 3/011* (2013.01); *G06F 3/017* (2013.01)
(58) Field of Classification Search
CPC ................................. G06F 3/011; G06F 3/017
See application file for complete search history.

(56) References Cited

U.S. PATENT DOCUMENTS

| 2018/0288586 | A1* | 10/2018 | Tran | ........................ | A63B 69/36 |
| 2018/0322444 | A1* | 11/2018 | Todeschini | ............ | G06F 3/0346 |
| 2019/0355275 | A1* | 11/2019 | Su | ............................ | G06F 3/011 |

* cited by examiner

*Primary Examiner* — Kent W Chang
*Assistant Examiner* — Chayce R Bibbee
(74) *Attorney, Agent, or Firm* — Muncy, Geissler, Olds and Lowe, P.C.

(57) ABSTRACT

A human negligence warning method based on augmented reality includes steps of: using a smart wearable device to photograph multiple physical operation elements of an electronic apparatus to obtain interface depth data; performing spatial position calculations according to the interface depth data, to set corresponding wrapping geometry elements between the physical operation elements and the smart wearable device to wrap the physical operation elements, respectively; photograph a hand of a wearer wearing the smart wearable device to obtain a gesture and a spatial position of the hand; and judging whether the hand touches one of the wrapping geometry elements according to the gesture and the spatial position, and further judging whether a corresponding procedure to be initiated by the physical operation element is correct if yes, If the corresponding procedure is not correct, then an warning operation is performed to avoid human negligence.

11 Claims, 7 Drawing Sheets

HUMAN NEGLIGENCE WARNING METHOD BASED ON AUGMENTED REALITY

CROSS-REFERENCE TO RELATED APPLICATIONS

This application claims priority of No. 109145466 filed in Taiwan R.O.C. on Dec. 22, 2020 under 35 U.S.C. 119, the entire content of which is hereby incorporated by reference.

BACKGROUND OF THE INVENTION

Field of the Invention

This disclosure relates to a human negligence warning method, and more particularly to a human negligence warning method based on augmented reality (AR).

Description of the Related Art

With the development of industrial automation, most workers in the manufacturing field input operating instructions through an instrument interface of a control panel to configure the parameters and state of the production apparatus and complete the corresponding manufacturing processes. Such operations are common in the machinery, semiconductor, chemical and electronic industries or even in industrial fields including transportation, military and electric power industries.

Under the economic global competition, today's manufacturing industry has the high variability of orders, the production operations have the high complexity and need the long working time, and the on-site worker has the high mental load and tends to get tired or slack, thereby causing the human negligence. Although complete standard operating procedures are present, the operators might still inadvertently touch the instrument buttons or start the incorrect operation procedures in actual operations. Every mistake made by the operator destroys the batch of products, and also interrupts the production line or causes the equipment failure or damage. In these cases, it takes time to restart the machine and calibrate and set associated parameters. In severe cases, work safety problems may be caused, thereby leading to casualties. In the semiconductor industry having the highly complex manufacturing processes, preventing similar human errors has become one of the keys to maintain the competitiveness.

Regarding the conventional production workflow, the operator is able to complete tasks in order through educating and training before work or reading instructions of the operation manual. However, such methods are more negative and are highly affected by human factors, such as ability, experience, physical and mental states, work pressure, field environment and the like, and the behavior of the operator cannot be reliably monitored.

Therefore, how to develop an initiative method to predict the intended behavior and immediately warn and prevent errors is indeed a problem to be solved.

BRIEF SUMMARY OF THE INVENTION

It is therefore an objective of this disclosure to provide a human negligence warning method based on augmented reality (AR), wherein AR and hand gesture tracking technologies are integrated to track a spatial position of a finger in a real-time manner and predict the intention of an operator for operating an instrument interface. If the intention is judged as an incorrect procedure, then the feedback warning, such as video, audio or vibration, is provided in advance to prevent the human error from occurring and to avoid the subsequent production loss or casualties.

To achieve the above-identified object, this disclosure provides a human negligence warning method based on augmented reality and applied to a smart wearable device. The human negligence warning method includes steps of: using the smart wearable device to photograph multiple physical operation elements of an electronic apparatus to obtain interface depth data of the physical operation elements, wherein the smart wearable device communicates with the physical operation elements; performing spatial position calculations according to the interface depth data to obtain a spatial position calculating result, and setting corresponding wrapping geometry elements between the physical operation elements and the smart wearable device to wrap the physical operation elements, respectively, according to the spatial position calculating result; photographing a hand of a wearer wearing the smart wearable device, and obtaining a gesture and a spatial position of the hand; and judging whether the hand touches one of the wrapping geometry elements according to the gesture and the spatial position of the hand, wherein if the hand touches the wrapping geometry element, then it is further judged whether a corresponding procedure to be initiated by the physical operation element corresponding to the wrapping geometry element being touched is correct or not, wherein if the corresponding procedure is not correct, then a warning operation is performed.

With the above-mentioned embodiment, it is possible to prevent the button from being inadvertently touched or to avoid the incorrect operation procedure on the human-operated instrument interface. This disclosure combines hand gesture tracking with position tracking based on the AR concept, and firstly calculates the spatial position and dimension of each associated panel button. Then, a virtual wrapping geometry element is added to wrap each panel button according to the configured safe distance. Intersection calculations are performed according to the real-time estimated spatial position of the finger (or hand) and the wrapping geometry elements. If an intersection is present between the virtual wrapping geometry element and the finger, then it represents that the operator will touch the corresponding button, and the given operation procedure is inspected to judge whether the procedure is correct. When necessary, the warning message is outputted, or the control panel is temporarily disabled to avoid the error. Thus, the prior art problem can be solved.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

In this disclosure, virtual models (or wrapping geometry elements) for preventing errors are added to the real environment seen by a wearer (or an operator) through the smart wearable device according to the AR concept, and function as references for calculating whether the operator triggers the buttons (or physical operation elements). In addition, the hand gesture tracking technology is also integrated to real-time predict the operator's operation intention effectively. The technology has various advantages. First, the image recognition and spatial positioning are adopted to rapidly obtain the positions and dimensions of the panel buttons without being restricted by the model or type of the machine and without being affected by the geometric variations of the operator's hand. Second, the technology is able to collocate with the existing AR intelligent glasses because the operator's hands need not to hold an additional device and the operator needs not to change the operating procedures or working habits. Third, different sensory feedbacks, including visual, auditory and tactile warnings, are utilized to avoid the human negligence, or temporarily disable the control panel to avoid operational errors in several ways.

Figure 1:
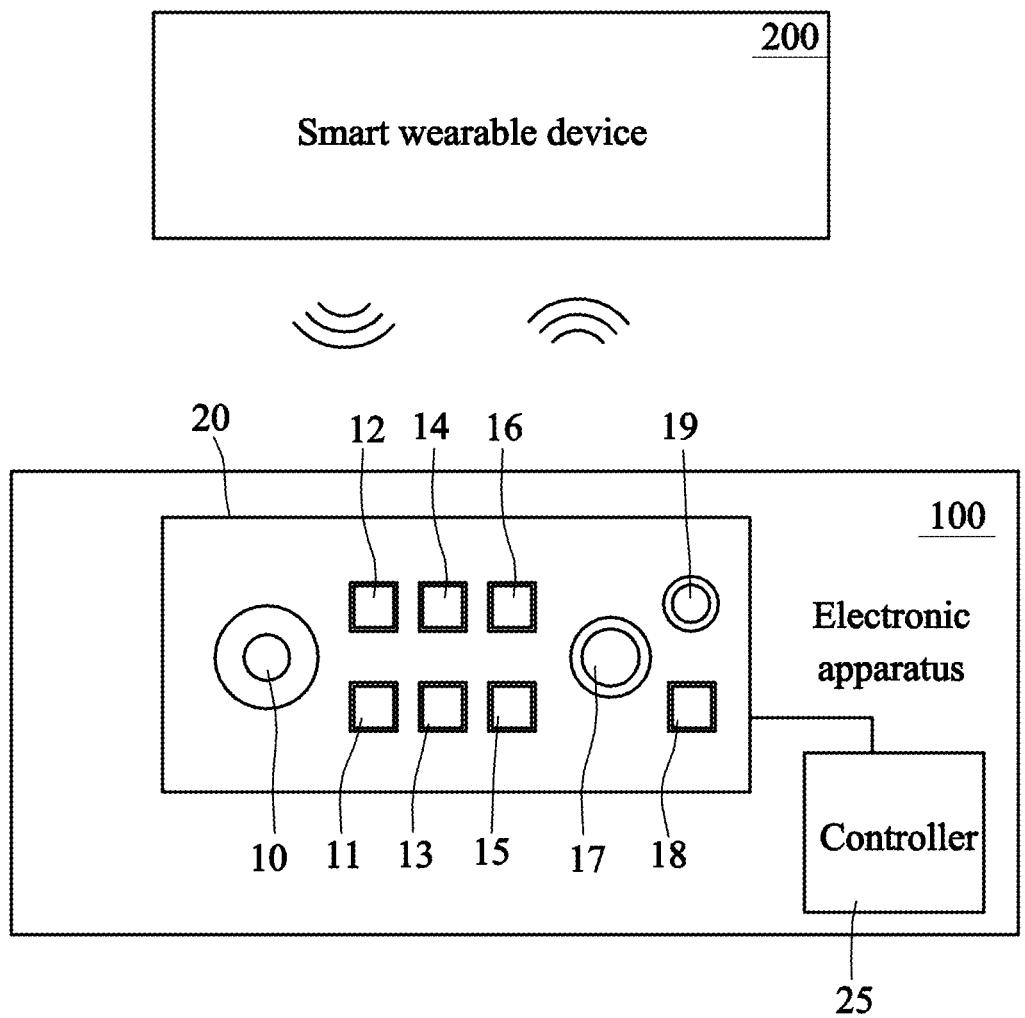
FIG. 1 is a block diagram showing a system of implementing a human negligence warning method based on augmented reality.
Figure 2:
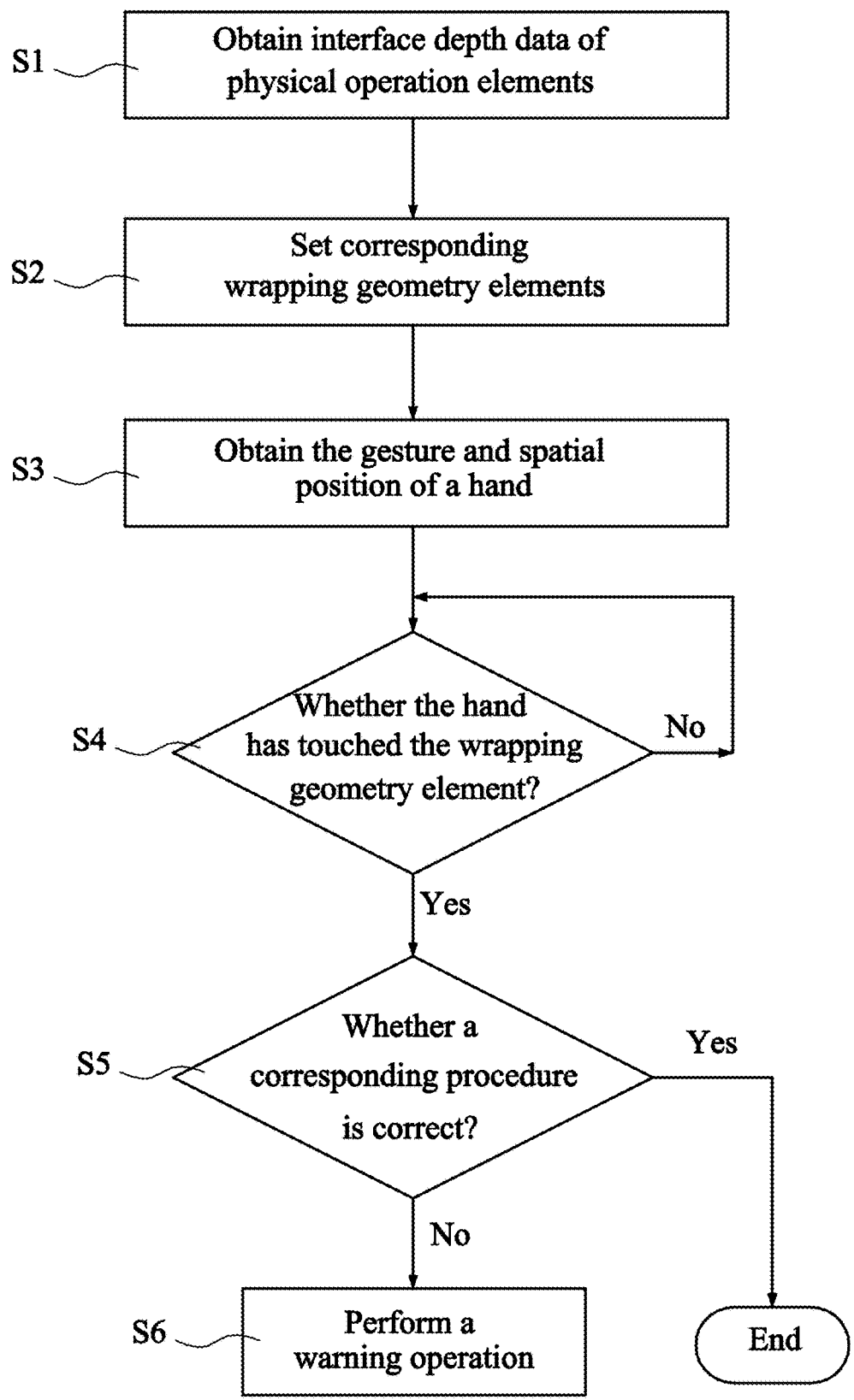
FIG. 2 is a flow chart showing implementation of the human negligence warning method.

FIG. 1 is a block diagram showing a system of implementing a human negligence warning method based on augmented reality. FIG. 2 is a flow chart showing implementation of the human negligence warning method. Referring to FIGS. 1 and 2, the human negligence warning method based on augmented reality is applied to a smart wearable device 200. The smart wearable device 200 includes, for example but without limitation to, a pair of AR glasses or an AR helmet, and communicates with an electronic apparatus 100. The electronic apparatus 100 can be applied to, for example but without limitation to, the machinery, semiconductor, chemical and electronic industries or even in industrial fields including transportation, military and electric power industries. The electronic apparatus 100 includes a controller 25 and an instrument interface 20. The instrument interface 20 has multiple physical operation elements 10 to 19. The smart wearable device 200 communicates with the physical operation elements 10 to 19 through the controller 25. When the physical operation elements 10 to 19 are physically pressed, switched or rotated by the operator, the corresponding procedures including, for example but without limitation to, power on, power off, emergency stop, controlling manufacturing processes of each processing station (not shown), temperature control and gas exhaust, can be performed through the controller 25.

Figure 3:
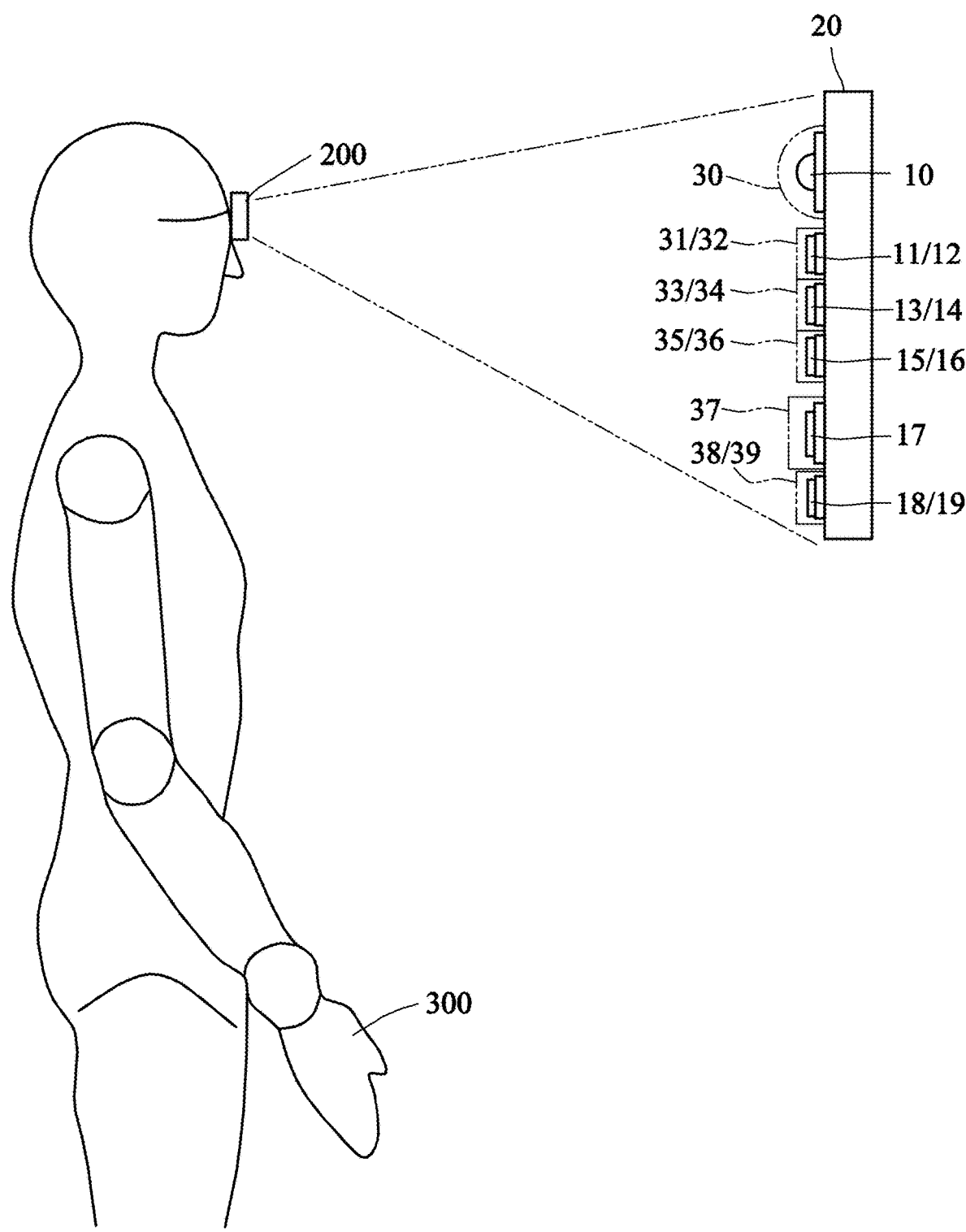
FIG. 3 is a side view showing an operation condition of the human negligence warning method.

FIG. 3 is a side view showing an operation condition of the human negligence warning method. Referring to FIGS. 1 to 3, the human negligence warning method includes the following steps. First, the wearer puts on the smart wearable device 200 and starts the functions thereof, and uses the smart wearable device 200 to photograph multiple physical operation elements 10 to 19 (on the operation panel) of the electronic apparatus 100 to obtain interface depth data of the physical operation elements 10 to 19, as shown in a step S1.

It is worth noting that the photographed results of the smart wearable device 200 can be directly displayed to the wearer in a real-time manner.

Next, spatial position calculations are performed to obtain a spatial position calculating result according to the interface depth data to obtain spatial positions of the physical operation elements 10 to 19, and corresponding wrapping geometry elements 30 to 39 wrapping the physical operation elements 10 to 19, respectively, are set between the physical operation elements 10 to 19 and the smart wearable device 200 according to the spatial position calculating result, as shown in a step S2. The wrapping geometry elements 30 to 39 provide the functions of protective covers, and the wearer is able to see the covers. That is, the smart wearable device 200 displays the wrapping geometry elements 30 to 39 to the wearer so that the wearer knows that the warning protection function has been enabled. In another example, the smart wearable device 200 does not display the wrapping geometry elements 30 to 39 to the wearer to prevent the field of vision of the wearer from being confused. The wrapping geometry elements 30 to 39 may be generated by offsetting distances outwards from the surfaces of the physical operation elements 10 to 19 (in directions to the wearer).

Thus, when the human negligence warning function is enabled, the wearer needs to perform the initialization step, in which the wearer wearing the smart wearable device 200, such as the AR intelligent glasses, stands at a specify position, when necessary, and faces the instrument interface 20 of the electronic apparatus 100. A camera of the smart wearable device 200 captures image data, and the spatial positioning calculation is performed with reference to the pre-given models and images of the instrument interface 20. After an instrument interface model has been created at a spatial position, wrapping geometry elements between the user and the corresponding physical operation elements (e.g., buttons) are added to wrap the corresponding buttons according to a predetermined safe distance. In one example, these wrapping geometry elements are not displayed, and are in the form of virtual elements combined with the real environment.

Figure 4:
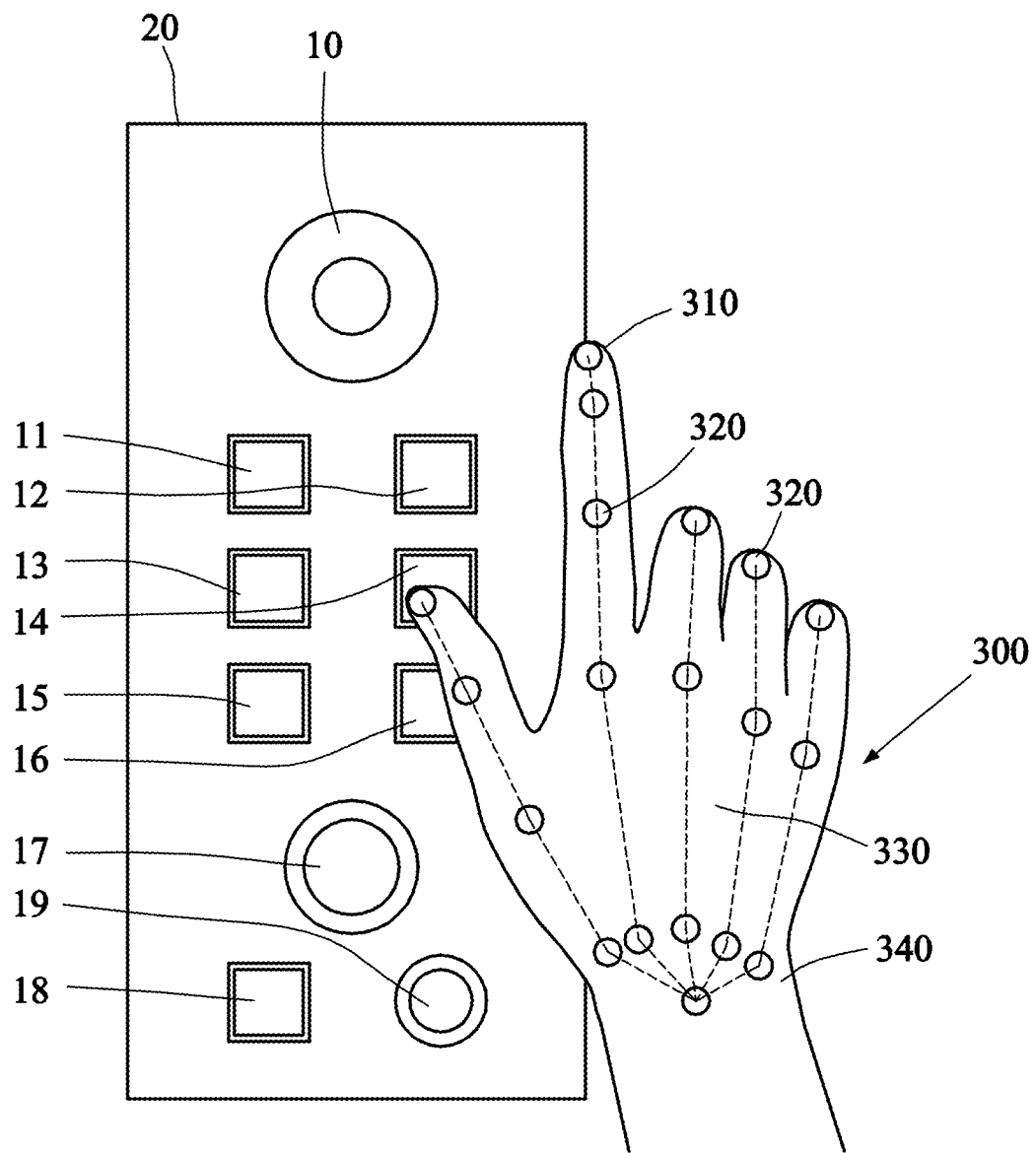
FIG. 4 is a front view showing another operation condition of the human negligence warning method.

FIG. 4 is a front view showing another operation condition of the human negligence warning method. Referring to FIGS. 2 to 4, the wearer's hand 300 moves to a position between the smart wearable device 200 and the instrument interface 20, and the smart wearable device 200 photographs the hand 300 to obtain the gesture and the spatial position of the hand 300, as shown in a step S3. The wearer can see the hand 300 through the smart wearable device 200. In one example, the smart wearable device 200 photographs the hand 300 to track spatial coordinates of a finger tip 310 of the hand 300 in a real-time manner, and calculates spatial Euclidean distances between the finger tip 310 and the wrapping geometry elements 30 to 39 to obtain relative positional relationships (relative spatial relationships) between the physical operation elements 10 to 19 and the hand 300. When one of these spatial Euclidean distances is smaller than a warning distance, the corresponding physical operation element is disabled. Furthermore, in the operation process, the smart wearable device 200 photographs the hand 300, and obtains the gesture and the spatial position of the hand 300 by real-time tracking the finger tip 310, finger joints 320, a palm 330 and a wrist 340 of the hand 300 using image recognition technology. For example, when the physical operation element 11 needs to be pressed, and it is judged that the wearer intends to rotate the physical operation element 11, the warning operation may also be performed.

The warning distance is equivalent to the safe distance, according to which the error warning timing is determined. When the safe distance is set to be longer, the warning operation can be performed at a farther distance, so the response time gets longer. On the contrary, the response time gets shorter. In addition, the wrapping geometry element may have a simple geometric shape, such as a plane, a circular surface or a spherical surface, or may be a portion of a cube, a cylinder or a sphere. In addition, the wrapping geometry element may be generated according to the shape of the physical operation element by offsetting a distance from the surface of the physical operation element.

Figure 5:
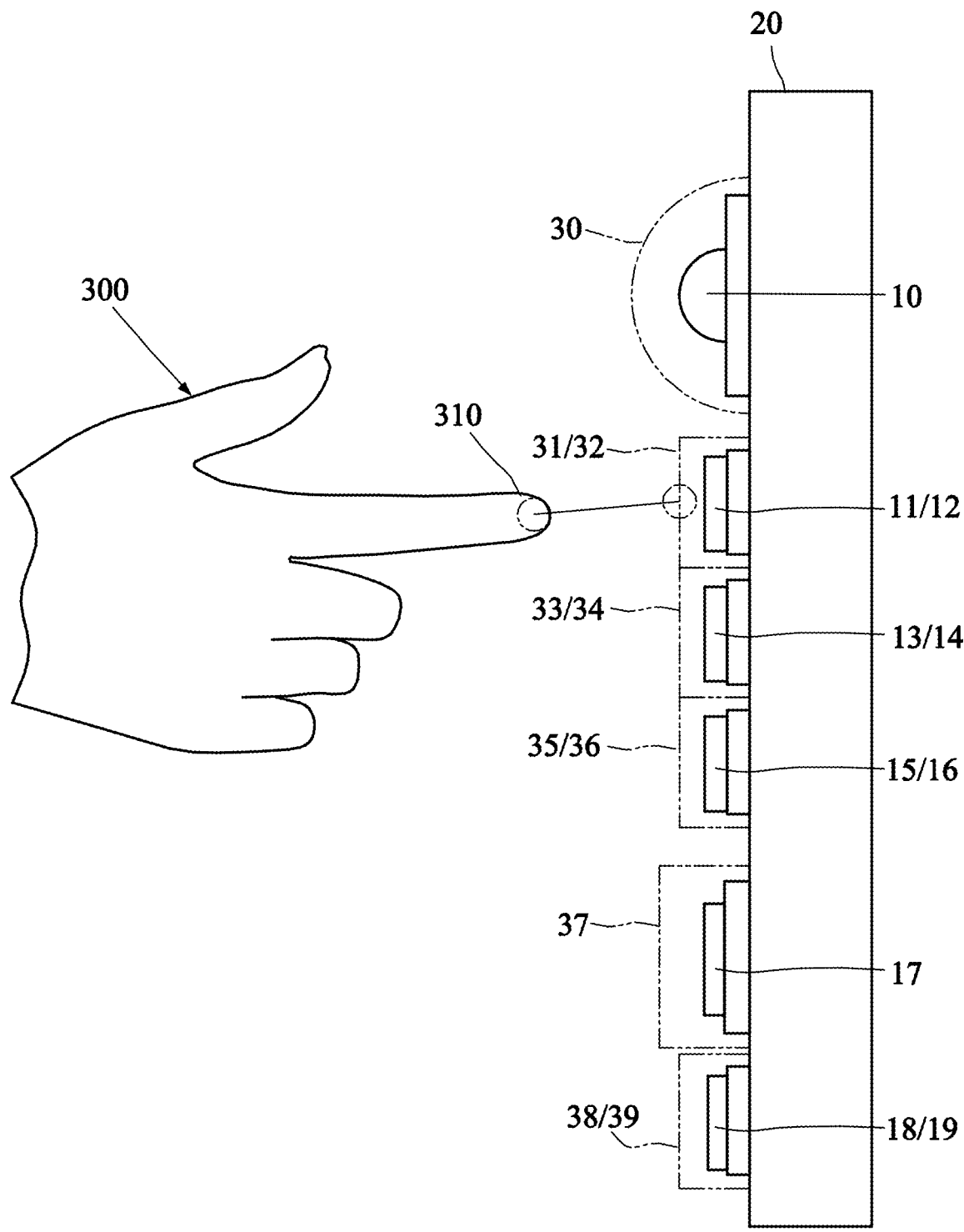
FIGS. 5 and 6 are side views showing other operation conditions of the human negligence warning method.
Figure 6:
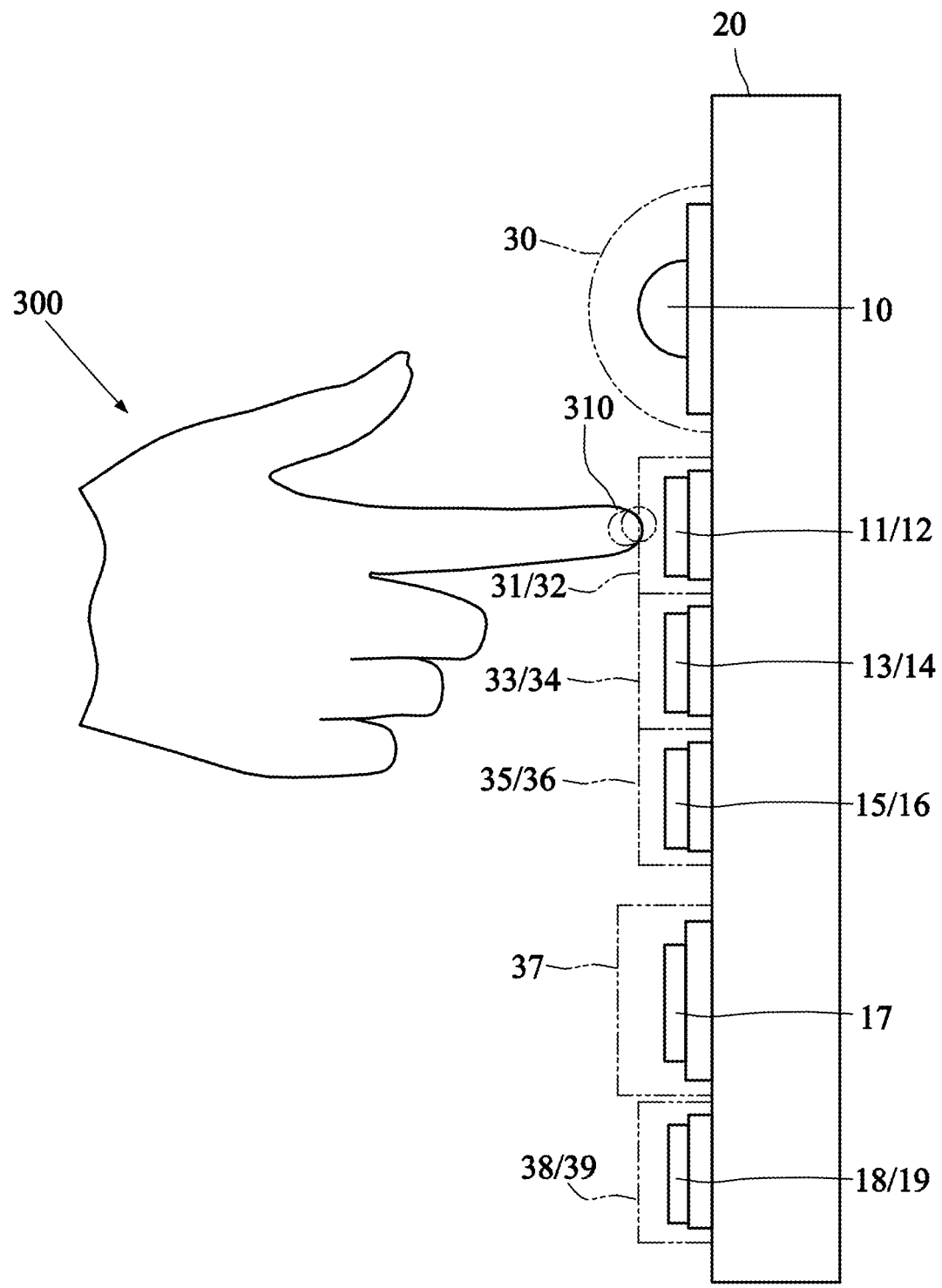

FIGS. 5 and 6 are side views showing other operation conditions of the human negligence warning method, wherein the finger tip 310 of FIG. 5 has not yet touched the wrapping geometry element 31/32, and the finger tip 310 of FIG. 6 has touched the wrapping geometry element 31/32. Referring to FIGS. 2 to 6, the smart wearable device 200 judges whether the hand 300 has touched one of the wrapping geometry elements 30 to 39 (referred to as a touched wrapping geometry element) according to the gesture and the spatial position of the hand 300, as shown in a step S4. If the hand 300 has touched the wrapping geometry element, then it is further judged whether a corresponding procedure (to-be-performed procedure, step or operation) of the physical operation element 10/11/12/13/14/15/16/17/18/19 corresponding to the touched wrapping geometry element 30/31/32/33/34/35/36/37/38/39 is correct (as shown in a step S5) or not. If the procedure is not correct, then a warning operation is performed, as shown in a step S6. For instance, when the electronic apparatus 100 is started to perform wet etching on a batch of wafers and the etching time has not reached a predetermined time (e.g., 40 minutes), water cleaning cannot be performed. If the hand 300 has touched the wrapping geometry element 31 corresponding to the physical operation element 11 for enabling the water cleaning, and the controller 25 of the electronic apparatus 100 has notified the smart wearable device 200 of the wet etching being performed for only 30 minutes, then the smart wearable device 200 judges that the corresponding procedure is incorrect and thus performs the warning operation. Therefore, the smart wearable device 200 can judge whether the corresponding procedure is correct or not according to pre-planned operation procedures stored in the electronic apparatus 100. In the step S5, if the corresponding procedure is judged as correct, then no warning operation is performed, and the hand 300 will smoothly operate (e.g., press) the physical operation element 11 to perform the corresponding procedure.

The warning operation includes one or both of: (a) disabling the physical operation element corresponding to the touched wrapping geometry element; and (b) outputting a warning message. The warning message may be outputted to the wear by one or multiple ones of displaying video prompt messages or graphic icons representative of error or warning in the smart wearable device 200, outputting the warning audio messages to stop the error, or vibrating to provide the tactile sensation. Alternatively, the warning operation may also include: disabling all of the physical operation elements 10 to 19; and/or disabling the physical operation element corresponding to the touched wrapping geometry element and its peripheral physical operation element (i.e., some of the wrapping geometry elements are disabled). For example, the physical operation element 11 and its nearest peripheral physical operation elements 10 and 12 to 14 (the first layer of nearer elements) are disabled. The other farther physical operation elements 15 to 19 cannot be inadvertently touched, and are not disabled.

Figure 7:
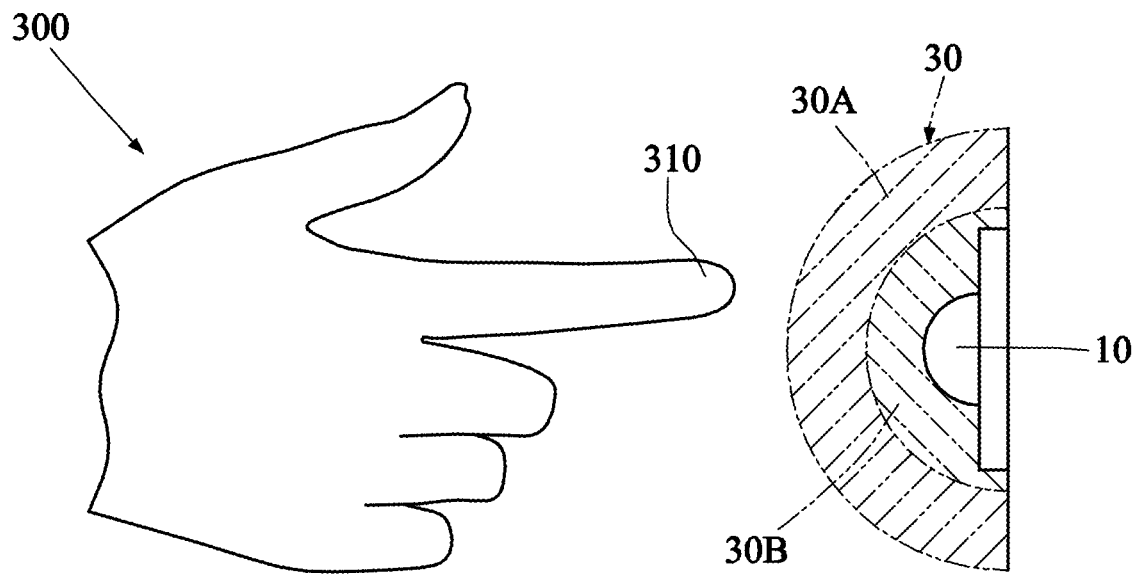
FIG. 7 is a side view showing an operation condition of a modified example of FIG. 6.

FIG. 7 is a side view showing an operation condition of a modified example of FIG. 6. As shown in FIG. 7, multiple layers of safe distances can be set to one or multiple wrapping geometry elements. For example, the wrapping geometry element 30 has an outer layer 30A and an inner layer 30B. When the finger tip 310 of the hand 300 only touches the outer layer 30A (e.g., 10 cm from the physical operation element 10), a first sub-operation (e.g., outputting the warning message) of the warning operation is performed. When the finger tip 310 touches the outer layer 30A and the inner layer 30B (e.g., 5 cm from the physical operation element), a second sub-operation (e.g., disabling the corresponding physical operation element 10) of the warning operation is performed, so that the advanced warning protection can be obtained.

With the embodiments of this disclosure, it is possible to prevent the button from being inadvertently touched or to avoid the incorrect operation procedure on the human-operated instrument interface. This disclosure combines hand gesture tracking with position tracking based on the AR concept, and firstly calculates the spatial position and dimension of each associated panel button. Then, a virtual wrapping geometry element is added to wrap each panel button according to the configured safe distance. Intersection calculations are performed according to the real-time estimated spatial position of the finger (or hand) and the wrapping geometry elements. If an intersection is present between the virtual wrapping geometry element and the finger, then it represents that the operator will touch the corresponding button, and the given operation procedure is inspected to judge whether the procedure is correct. When necessary, the warning message is outputted, or the control panel is temporarily disabled to avoid the error. Thus, the prior art problem can be solved.

It is worth noting that all the examples mentioned hereinabove can be appropriately combined, replaced or modified to provide the diversified effects and satisfy the design requirements.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A human negligence warning method based on augmented reality and applied to a smart wearable device, the human negligence warning method comprising steps of:

using the smart wearable device to photograph multiple physical operation elements of an electronic apparatus to obtain interface depth data of the physical operation elements, wherein the smart wearable device communicates with the physical operation elements;

performing spatial position calculations according to the interface depth data to obtain a spatial position calculating result, and setting corresponding wrapping geometry elements between the physical operation elements and the smart wearable device to wrap the physical operation elements, respectively, according to the spatial position calculating result;

photographing a hand of a wearer wearing the smart wearable device, and obtaining a gesture and a spatial position of the hand; and judging whether the hand touches one of the wrapping geometry elements according to the gesture and the spatial position of the hand, wherein if the hand touches the wrapping geometry element, then it is further judged whether a corresponding procedure to be initiated by the physical operation element corresponding to the wrapping geometry element being touched is correct or not, wherein if the corresponding procedure is not correct, then a warning operation is performed.

2. The human negligence warning method according to claim 1, wherein the smart wearable device judges whether the corresponding procedure is correct according to pre-planned operation procedures stored in the electronic apparatus.

3. The human negligence warning method according to claim 1, wherein the warning operation comprises disabling the physical operation element corresponding to the wrapping geometry element being touched.

4. The human negligence warning method according to claim 3, wherein the warning operation comprises outputting a warning message.

5. The human negligence warning method according to claim 1, wherein the warning operation comprises disabling all of the physical operation elements.

6. The human negligence warning method according to claim 1, wherein the smart wearable device does not display the wrapping geometry elements to the wearer.

7. The human negligence warning method according to claim 1, wherein the smart wearable device displays the wrapping geometry elements to the wearer.

8. The human negligence warning method according to claim 1, wherein each of the wrapping geometry elements has an outer layer and an inner layer, wherein when the hand only touches the outer layer, a first sub-operation of the warning operation is performed, wherein when the hand touches the outer layer and the inner layer, a second sub-operation of the warning operation is performed.

9. The human negligence warning method according to claim 1, wherein relative positional relationships between the hand and the physical operation elements are obtained by real-time tracking spatial coordinates of a finger tip of the hand and calculating spatial Euclidean distances between the finger tip and the wrapping geometry elements.

10. The human negligence warning method according to claim 1, wherein the gesture and the spatial position of the hand are obtained by real-time tracking a finger tip, finger joints, a palm and a wrist of the hand.

11. The human negligence warning method according to claim 1, wherein the warning operation comprises outputting a warning message.

* * * * *